United States Patent [19]
Knoll et al.

[11] Patent Number: 5,243,499
[45] Date of Patent: Sep. 7, 1993

[54] DISTRIBUTOR UNIT FOR ATTACHING AND CONNECTING ELECTRICAL LINES IN TELECOMMUNICATION SYSTEMS

[75] Inventors: Rudolf Knoll, Berg; Peter Stoerk, Eurasburg, both of Fed. Rep. of Germany

[73] Assignee: Siemens Aktiengesellschaft, Munich, Fed. Rep. of Germany

[21] Appl. No.: 802,487

[22] Filed: Dec. 5, 1991

[30] Foreign Application Priority Data

Dec. 19, 1990 [DE] Fed. Rep. of Germany ....... 9017157

[51] Int. Cl.⁵ .............................................. H02B 1/01
[52] U.S. Cl. .................................... 361/829; 379/327; 361/826
[58] Field of Search ................ 174/48, 49, 68.1, 72 A, 174/72 R, 77 R, 99 B, 95-101; 211/26; 361/334, 340, 390, 391, 394, 428, 429; 379/326, 327, 329, 330

[56] References Cited

U.S. PATENT DOCUMENTS

| Re. 27,746 | 8/1973 | Hamilton | 361/428 |
| 4,371,757 | 2/1983 | Debortoli et al. | 361/428 |
| 4,470,102 | 9/1984 | DeLuca et al. | 361/428 |
| 4,649,236 | 3/1987 | DeLuca et al. | 379/427 |

FOREIGN PATENT DOCUMENTS

| 0067636 | 12/1982 | European Pat. Off. . | |
| 0109881 | 5/1984 | Fed. Rep. of Germany | 361/429 |
| 3727236 | 3/1989 | Fed. Rep. of Germany . | |
| 3-38099 | 2/1991 | Japan | 361/415 |

*Primary Examiner*—Leo P. Picard
*Assistant Examiner*—D. Sparks
*Attorney, Agent, or Firm*—Hill, Steadman & Simpson

[57] ABSTRACT

Distributor unit for attaching and connecting electrical lines in telecommunication systems. A rail (5) is secured in two different positions in a simple manner from a servicing side and is provided for the acceptance of accessory equipment (15). The two positions are in the upper end region of the carrier part (1) vertically aligned with its long side in that the rail (5) is hooked to or, respectively, plugged onto the upper edge of a plate (4) that is rigidly connected to the carrier part (1). The edge of the plate (4) provided for the plug fastening of the distributor unit extends beyond the upper edge of the carrier part (1) in a longitudinal direction. Different accessory equipment is easily attached to the front side of the rail independently of the wiring of the distributor. The parts of the distributor normally covered by the planar extent of the rail toward the servicing side are accessible at any time in the respectively other position of this rail.

13 Claims, 3 Drawing Sheets

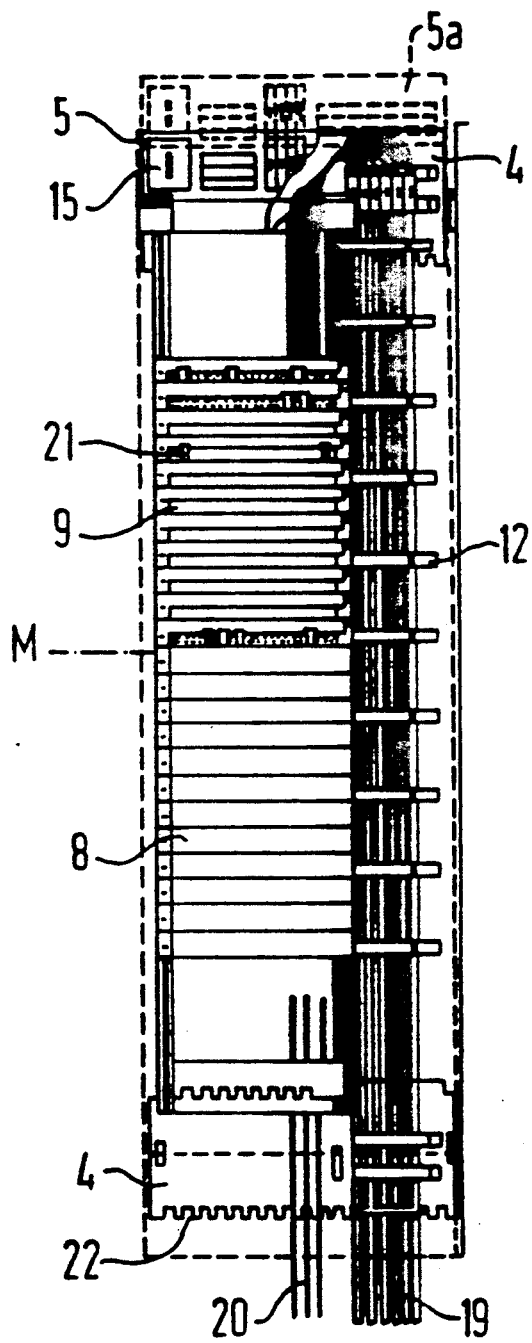

DISTRIBUTOR UNIT FOR ATTACHING AND CONNECTING ELECTRICAL LINES IN TELECOMMUNICATION SYSTEMS

BACKGROUND OF THE INVENTION

The present invention is directed to a distributor unit for attaching and connecting electrical lines in telecommunication systems having an oblong carrier part that accepts plug connector strips and having at least one retainer element connectable thereto at the back side that in turn serves the purpose of producing the ready-to-use final installation condition. The carrier part is vertically aligned with its long side in this final condition.

Such a distributor provides for running lines from any arbitrary terminal point of the plug connector strips for the incoming lines to any arbitrary terminal point of the plug connector strips for the outgoing lines leading, for example, to the switching equipment. Recently designed distributor units are fashioned assembly-friendly and maintenance-friendly and a surveyable wiring arrangement is desired even given increasing wiring density. A special fashioning of the plug connector strips makes it possible to reduce the dimensions of a distributor. In addition to the plug connector strips and other elements present for the wire guidance, auxiliary equipment are fundamentally required for the greatest variety of purposes. Since, for example, such auxiliary equipment serve measuring purposes or, respectively, must also be subsequently attached as needed, an additional space inside the distributor unit that lies outside the wiring region is usually provided for such auxiliary equipment. Because the additional space for the auxiliary equipment that should be easily accessible must be made available in addition to the space required for the elements necessary for the actual distributor function, correspondingly enlarged outside dimensions of the distributor unit are required.

SUMMARY OF THE INVENTION

It is an object of the present invention to provide a distributor unit wherein the outside dimensions are defined only by the elements required for the distributor function and wherein an easy attachment of accessory equipment is nonetheless possible. This is achieved in that receptacle elements for the direct fastening (which can be undone at any time without using tools) of a rail-like part proceeding in a transverse direction are provided in at least one end region. This rail-like part accepts additional assemblies and/or special components. Proceeding from the front side and due to the arrangement of these receptacle elements, the rail-like part can be brought into a normal position covering a sub-region of the distributor unit and, given the same alignment, can be brought into a parking position for access to the covered sub-region. A length that at least enables this offset is provided for the electrical conductors connected to the additional assemblies and/or special components. The space offered for accessory equipment is expanded by the solution of the present invention without reducing the space present for those component parts that are absolutely necessary, for example plug connector strips, wire guide elements, and for the wiring and without modifying the dimensions of such a distributor unit prescribed solely by these component parts taking a desired, maximum number of connections into consideration. For example connector boxes, exchange line switches, certain types of protective switches, elements for error control devices and for connection to ground are such accessory equipment. Access to these accessory equipment secured to the rail-like element is easily possible at any time. For example, measurements for testing purposes can thus be undertaken on the basis of the connector box secured thereto that is accessible without further ado. The rail directly put in place from the outside proceeding from the servicing side can be displaced into another position with a simple manipulation, so that region of the distributor that it normally covers is likewise accessible without further ado.

In a development of the present invention, the receptacle elements for the rail-like element are co-formed by a plate having a C-shape and serving as a retainer element. The leg depth of the plate defines the spacing from the installation wall.

The receptacle elements thus lie outside the carrier part that accepts the plug connector strips, so that this carrier part can be manufactured as an extruded profile.

A development provides that the plate is attached to the carrier part in its upper and lower end regions and is dimensioned such that it projects beyond the carrier part at least at its upper or, respectively, lower end of the long side. Cables, including cables that are deflected and are conducted from above to the plug connector strips, are conducted in this projecting region.

In conjunction with the above-explained development, a development of the present invention provides that the rail-like element is fashioned U-shaped; that every leg identically has hook-shaped formed portions arranged in the region of the upper edge and at least one slot in the region of its lower edge, so that it can be directly hooked into or, respectively, plugged onto the upper edge serving as a receptacle element at the plate attached in the upper end region of the carrier part, namely in a first normal position and in another parking position, and such that, in the normal position, it is exclusively arranged inside the region of the plate that projects beyond the carrier part.

A mounting depth that at least corresponds to the height of the carrier part is consequently available for the U-shaped rail that is hooked over the edge of the projecting plate in a simple manner and for the auxiliary modules and special components to be attached thereto at its surface pointing toward the servicing side.

In an extremely simple manner, the rail-like element is displaced into the second position that represents a parking position in that the slots that are present at the lower edge of its lateral legs (these slots being somewhat broader than the thickness of the plate) are slipped onto the plate proceeding from above.

The rail-like element is inventively provided with a universal perforation. The greatest variety of accessory equipment can thus usually be directly secured without any further processing.

One development of the present invention provides that the plate also laterally projects at one side and shaped portions are present at this projecting region to which fastening elements are attached, incoming and outgoing line leads being capable of being attached with these fastening elements.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 4 is a plan view of the front side of a distributor unit.

DESCRIPTION OF THE PREFERRED EMBODIMENT

Figure 1:
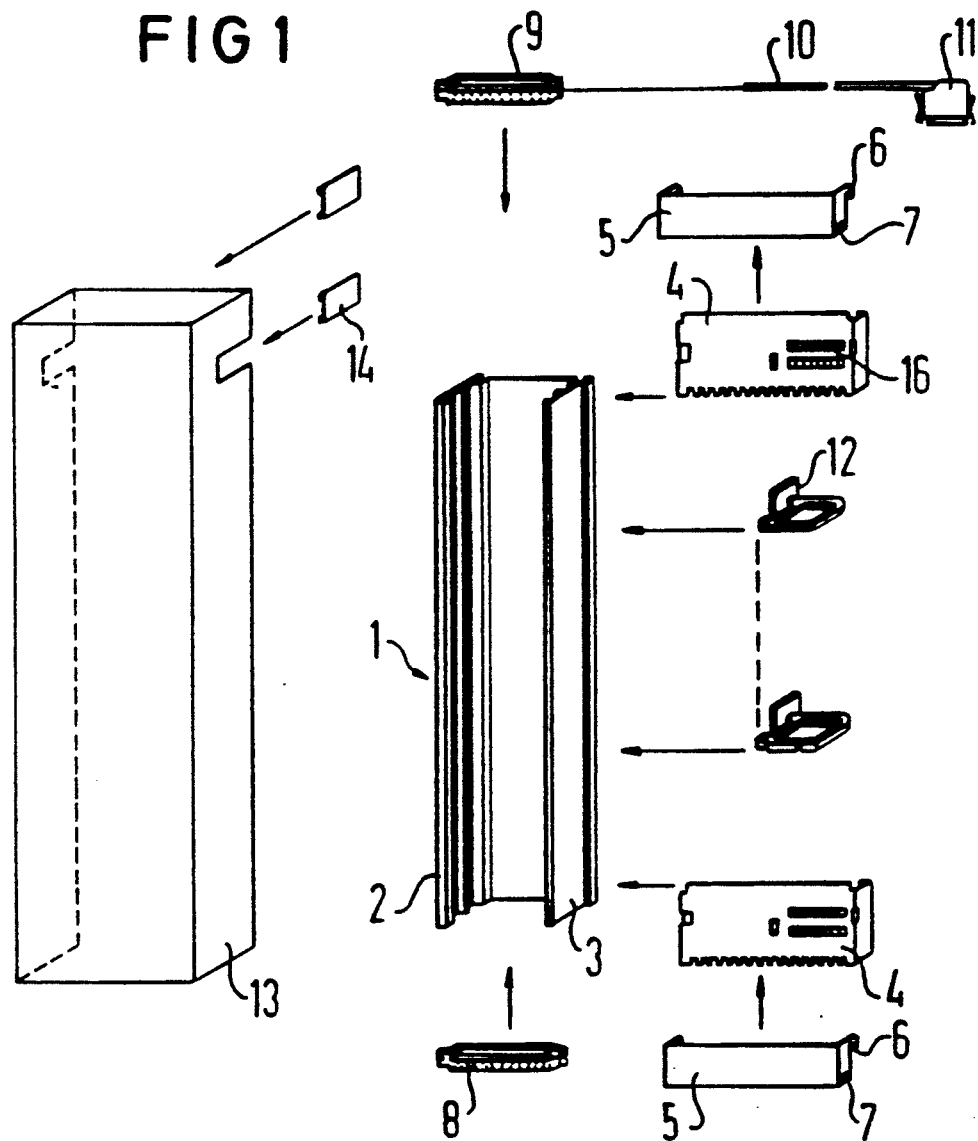
FIG. 1 is a perspective exploded view of a distributor unit.

According to FIG. 1, the basic unit for mounting at, for example, a wall is composed of the carrier part 1 and of the plate 4 connectable thereto in the upper and lower region. The carrier part is fashioned U-shaped and is manufactured as an extruded profile, whereby any desired length dimension is then respectively possible by simply being separated from the extruded material. On the basis of an appropriate fashioning of the free edge of each and every leg 2 or, respectively, 3 of this U-shape of the carrier part, the plug connector strips 8 or, respectively, 9 can be secured to these edges. To this end, for example, the free edge of the one leg can have a through, potentially slightly inwardly inclined, fully cylindrical shape. A plug connector strip that is provided with a cut-out adapted thereto is then plugged onto this fully cylindrical shape. The other leg has a through screw channel at the free upper edge.

After the plug connector strip has been plugged onto the edge of the other leg fashioned as a fully cylindrical shape, this plug connector strip can be put in place on the edges of the screw channel at any arbitrary location of the long side of the carrier part, for example with a flange attached thereto. Given an appropriate perforation of the flange, the plug connector strip can then be secured to the carrier part 1 in the screw channel with a self-tapping screw. In the manner just set forth, the carrier part accepts a plurality of plug connector strips 8 or, respectively, 9 that have their long sides following one another in order to form a distributor block. For example, plug connector strips wherein terminal elements are provided at the long sides lying opposite one another can be employed as plug connector strips 9. In accordance therewith, for example, the terminal elements for the lines that lead to the switching equipment and that are seldom changed are arranged at the back side of the plug connector strip. These lines of the internal side departing as cable 10 can already be connected in the factory. They are connected to a plug means 11 for contacting to the cooperating contacts present in the switching equipment. The terminal elements for the external side, i.e. for the subscriber lines, continue to be provided at the front servicing side. These terminal elements are thus easily accessible, so that changes in positions of the plug connector strip can be easily undertaken. For an ordered guidance of the conductors, hook-shaped wire guide elements 12 can be snapped onto the one leg 3 of the U-shaped profile in a simple way. A vertical or perpendicular channel for guiding the lines is thus made available with these wire guide elements.

For wall fastening, the carrier part 1 is screwed to a C-shaped plate 4 at its upper and lower end. This plate projects beyond the carrier part 1 both in longitudinal a direction as well as at one side. A defined distance between the distributor block and a wall surface can be provided by such a plate after mounting. Cables are to be conducted in this wall spacing region. The perforations 16 present in the laterally projecting part of the plate 4 serve the purpose of securing the cables laterally held by the wire guide elements 12 with appropriate clips. After, for example, being deflected, the appertaining conductors are then conducted from above to the plug connector strips in the space provided by the carrier part 1. The illustration of FIG. 1 also shows a rail-like element 5, referred to below as a rail, that serves the purpose of fastening accessory equipment. As a result of the hook-shaped portion 6 or, respectively, as a result of the slot 7, this rail can be hooked into or, respectively, plugged onto the edge of the upper plate 4. After being completely equipped, a distributor unit can be provided with a cover hood 13. This cover hood 13 has recesses at both sides that are to be covered with inserted and locked plastic parts 14. These recesses serve the purpose of providing transverse channels when a distributor unit is to be expanded by an identical distributor unit arranged in immediate lateral proximity.

Figure 2:
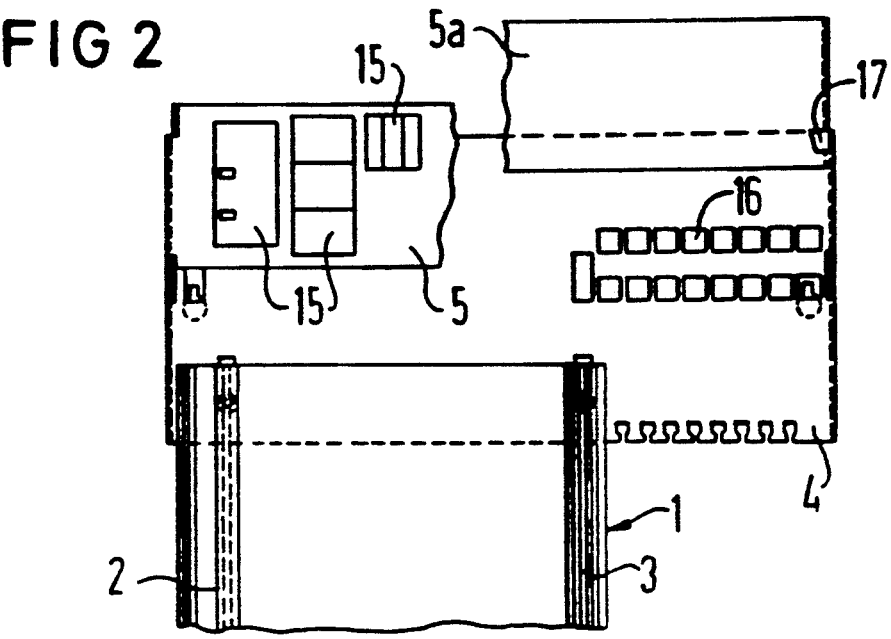
FIG. 2 and FIG. 3 are different views of the upper region of an unwired distributor unit.
Figure 3:
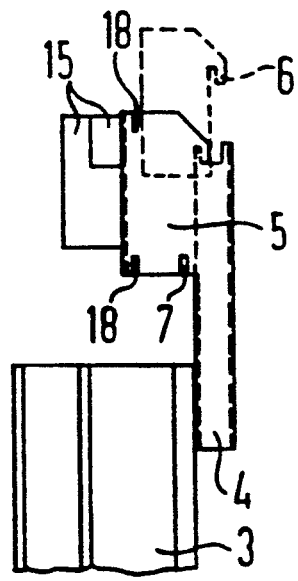

In a plan view, FIG. 2 shows the plate 4 secured in the upper end region of the carrier part 1 and at the back side thereof and shows the rail 5 that is in turn to be secured to the plate 4. FIG. 3 shows this structure in a side view. Both FIG. 2 and FIG. 3 show the embodiment without wiring.

This rail 5 then offers the possibility of securing accessory modules and special components 15 thereto, these being necessary for such a distributor unit or supplementing this unit as needed. These accessory equipment 15 can thus be placed at a location inside the distributor unit that is accessible at any time. As already mentioned at the outset, a connector box, exchange line switches, error control devices, additional terminal posts and grounding devices represent such accessory equipment. In the normal position, the rail 5 fashioned U-shaped is hooked to the upper edge of the plate 4 in an extremely simple way. This is enabled by the hook-shaped portions 6 that are present in the upper region of each and every leg in the proximity of the back edge. In order to facilitate this hooking, incisions 17 that have at least one obliquely proceeding edge can be provided at the upper edge of the plate 4 at both outside thereof. In the normal position, thus, the rail 5 is situated in a region of the distributor above the carrier part 1 that must be made available anyway for the proper guidance of the conductors, at least in terms of its height. In this normal position, this upper wiring region is at least partially covered by the attached rail 5. When these covered regions are to be made accessible, for example for carrying out cable work, then the rail 5 can be parked in a raised position. At its back region, every leg of the rail 5 preferably comprises a slot 7 proceeding from the lower edge. This slot in the rail 5 shaped of sheet-metal material is somewhat broader than the thickness of the plate 4 that is likewise manufactured of sheet metal material. This slot 7 present at both legs then serves the purpose of plugging the rail 5 onto the upper edge of the plate 4. The rail 5 is thus situated in the raised position indicated by 5a. The region of the distributor unit covered in the normal position is accessible in this position. The conductors that lead to the accessory modules or, respectively, special components 15 secured to the front side of the rail are designed such with respect to their length that the rail can be displaced at any time from the normal position into the parking position 5a.

Every leg of the rail 5 comprises a slot 18 respectively proceeding from the lower edge or, respectively, from the upper edge in the immediate proximity of the front wall. These slots can be utilized for mounting thin plate material at the back side of the rail wall. This plate can prevent the points of screws with which the accessory modules or, respectively special components 15 are secured from projecting into the space defined by the U-shaped rail 5. Such screw points, for example, could lead to damage to conductor insulation.

The equipping of the distributor unit with the individual elements is indicated in the distributor unit shown in FIG. 4 without a cover hood. Proceeding from a prescribed marking line M, a field of plug connector strips 9 is present above this line, these, for example, being allocated to the internal side as separating or disconnect strips. The conductors 19 to be connected to these strips consequently lead to the switching equipment. As already mentioned, these lines are secured to the plate laterally extending beyond the profile of the carrier part 1, for example with spring clips. These are introduced into the cut-outs 16 provided for this purpose. The insertion, contacting and fastening to the plates 4 is provided away from the profile in order to avoid threading given a later expansion. From the fastening point at the upper plate 4, the individual conductors are guided from above to the separating or disconnect strips 9 and are connected to their terminal elements. These terminal elements are usually fashioned as clamp elements that allow the stripping-free connection of the electrical conductors. These said terminal elements, for example, can be provided at the under side of the separating or disconnect strip. The terminal elements present at the upper side thereof are provided for the variable terminals to be occupied within the framework of what is referred to as strapping. They can be easily reached from the front. Protective plugs 21 are to be plugged as needed to the plug connector strips 9 allocated to the internal side.

Strapping is then not directly undertaken with the conductors of the external cable 20. Rather, the conductors are clamped to terminal elements of the strapping connectors 8 arranged under the marking line M. The actual strapping is then undertaken by drying the terminal elements of the separating or disconnect strips present at a front side and the terminal elements of the strapping connectors. As a result of the division of the strips ensuing proceeding from a defined marking M, for example, the expansion to be gradually undertaken in accord with the increase in the number of subscribers is facilitated when expansion is undertaken proceeding downward or, respectively, upward from this marking. The plug connector strips can be subsequently introduced independently of the wire guides.

The cut-outs 22 provided at the lower edge of the lower plate serve the purpose of attaching cable links for the additional holding of the cables in a simple way. The rail 5, which is equipped with components 15, hook of the upper plate is again indicated in FIG. 5. It is shown broken so that the conductors normally covered by it are visible. The position 5a of the rail corresponds to the parking position by simply plugging onto the edge of the plate 4.

The rail could also be held in two different positions arranged at the lower end of the carrier part 1. To this end, the hook-shaped portions 6 would have to be hooked into cut-outs that are attached at different heights.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A distributor unit for attaching and connecting electrical lines in telecommunication systems having an oblong carrier part that accepts plug connector strips, the carrier part being vertically aligned with a long side thereof in a final installation condition, comprising:

at least one retainer element connected to one end of a back side of the carrier part in an end region thereof, said retainer element proceeding in a transverse direction relative to the long side of the carrier part;

rail-like element releasable fastened to said retainer element, said rail-like element being displaceable between a normal position and a parking position, said rail-like element accepting assemblies and/or special components;

such that proceeding from a front of the rail-like element and due to the arrangement of the retainer element on the carrier part, the rail-like element can be brought into a normal position covering a sub-region of the distributor unit, and can also be brought into a parking position for access to the sub-region, lines connected to the assemblies and/or special components having a length that at least enables a displacement of the rail-like element from the normal position to the parking position.

2. The distributor unit according to claim 1, wherein the retainer element for the rail-like element is a plate having a C-shape; and wherein the plate has legs with a leg depth of the plate defining a spacing between an installation wall and the carrier part.

3. The distributor unit according to claim 2, wherein the plate is attached to the carrier part and dimensioned in upper and lower end regions thereof such that the plate projects beyond the carrier part at least at the respective end of the carrier part.

4. The distributor unit according to claim 3, wherein the rail-like element is fashioned U-shaped and has two legs; wherein each leg of the rail-like element has a hook-shaped portion arranged in a region of an upper edge thereof and a back-side edge thereof and at least one slot in a region of a lower edge thereof, so that the rail-like element is directly hookable onto an upper edge, both in the normal position as well as in the parking position, of the plate that is attached to the one end of the carrier part; and wherein, in the normal position, the rail-like element is arranged entirely inside a region of the plate projecting beyond the carrier part.

5. The distributor unit according to claim 4, wherein the rail-like element has at least one universal perforation.

6. The distributor unit according to claim 4, wherein the plate has a projecting part that laterally projects at one side of the plate and wherein fastening elements for the fastening of lines are attached to cut-outs in the projecting part.

7. A distributor unit for attaching and connecting electrical lines in telecommunication systems, comprising:
- an oblong carrier part that accepts plug connector strips, the carrier part being vertically aligned with a long side thereof in a final installation condition;
- at least one retainer element connected to one end of a back side of the carrier part in an end region thereof, said retainer element proceeding in a transverse direction relative to the long side of the carrier part;
- rail-like element releasable fastened to said retainer element, said rail-like element being displaceable between a normal position and a parking position, said rail-like element accepting assemblies and/or special components;
- such that proceeding from a front of the rail-like element and due to the arrangement of the retainer element on the carrier part, the rail-like element can be brought into a normal position covering a sub-region of the distributor unit, and can also be brought into a parking position for access to the sub-region, lines connected to the assemblies and/or special components having a length that at least enables a displacement of the rail-like element from the normal position to the parking position;
- the retainer element for the rail-like element being a plate having a C-shape; and the plate being attached to the carrier part and dimensioned in upper and lower end regions thereof such that the plate projects beyond the carrier part at least at the respective end of the carrier part.

8. The distributor unit according to claim 7, wherein the rail-like element is U-shaped and has two legs; wherein each leg of the rail-like element has a hook-shaped portion arranged in a region of an upper edge thereof and a back-side edge thereof and at least one slot in a region of a lower edge thereof, so that the rail-like element is directly hookable onto an upper edge, both in the normal position as well as in the parking position, of the plate that is attached to the one end of the carrier part; and wherein, in the normal position, the rail-like element is arranged entirely inside a region of the plate projecting beyond the carrier part.

9. The distributor unit according to claim 8, wherein the rail-like element has at least one universal perforation.

10. The distributor unit according to claim 8, wherein the plate has a projecting part that laterally projects at one side of the plate and wherein fastening elements for the fastening of lines are attached to cut-outs in the projecting part.

11. A distributor unit for attaching and connecting electrical lines in telecommunication systems, comprising:
- an oblong carrier part that accepts plug connector strips, the carrier part being vertically aligned with a long side thereof in a final installation condition;
- at least one retainer element connected to one end of a back side of the carrier part in an end region thereof, said retainer element proceeding in a transverse direction relative to the long side of the carrier part;
- rail-like element releasable fastened to said retainer element, said rail-like element being displaceable between a normal position and parking position, said rail-like element accepting assemblies and/or special components;
- such that proceeding from a front of the rail-like element and due to the arrangement of the retainer element on the carrier part, the rail-like element can be brought into a normal position covering a sub-region of the distributor unit, and can also be brought into a parking position for access to the sub-region, lines connected to the assemblies and/or special components having a length that at least enables a displacement of the rail-like element from the normal position to the parking position;
- the retainer element for the rail-like element being a plate having a C-shape and being attached to the carrier part and dimensioned in upper and lower end regions thereof such that the plate projects beyond the carrier part at least at the respective end of the carrier part;
- and the rail-like element being U-shaped and having two legs, each leg of the rail-like element having a hook-shaped portion arranged in a region of an upper edge thereof and a back-side edge thereof and at least one slot in a region of a lower edge thereof, so that the rail-like element is directly hookable onto an upper edge, both in the normal position as well as in the parking position, of the plate that is attached to the one end of the carrier part, wherein in the normal position, the rail-like element is arranged entirely inside a region of the plate projecting beyond the carrier part.

12. The distributor unit according to claim 11, wherein the rail-like element has at least one universal perforation.

13. The distributor unit according to claim 11, wherein the plate has a projecting part that laterally projects at one side of the plate and wherein fastening elements for the fastening of lines are attached to cut-outs in the projecting part.

* * * * *